United States Patent
Arbjerg et al.

(10) Patent No.: US 10,843,725 B2
(45) Date of Patent: Nov. 24, 2020

(54) HYDRAULIC STEERING UNIT

(71) Applicant: Danfoss Power Solutions ApS, Nordborg (DK)

(72) Inventors: Niels Arbjerg, Sydals (DK); Charles Anthony Bates, Soenderborg (DK); Poul Ennemark, Soenderborg (DK); Mogens Frederiksen, Sydals (DK); Casper Mikael Olesen, Soenderborg (DK)

(73) Assignee: DANFOSS POWER SOLUTIONS APS, Nordborg (DK)

(*) Notice: Subject to any disclaimer, the term of this patent is extended or adjusted under 35 U.S.C. 154(b) by 294 days.

(21) Appl. No.: 15/970,231

(22) Filed: May 3, 2018

(65) Prior Publication Data
US 2018/0319427 A1     Nov. 8, 2018

(30) Foreign Application Priority Data
May 8, 2017 (DE) .................. 10 2017 109 800

(51) Int. Cl.
*B62D 5/08* (2006.01)
*B62D 5/065* (2006.01)
(Continued)

(52) U.S. Cl.
CPC ............. *B62D 5/065* (2013.01); *B62D 5/08* (2013.01); *B62D 5/093* (2013.01); *B62D 5/14* (2013.01); *B62D 7/144* (2013.01)

(58) Field of Classification Search
CPC ........... B62D 5/093; B62D 5/12; B62D 7/144
(Continued)

(56) References Cited

U.S. PATENT DOCUMENTS

| 4,006,664 A | 2/1977 | Brown |
| 4,860,846 A * | 8/1989 | Uchida .................. B62D 5/083 |
| | | 180/423 |

(Continued)

FOREIGN PATENT DOCUMENTS

| CN | 201646845 U | 11/2010 |
| CN | 203047347 U | 7/2013 |

(Continued)

OTHER PUBLICATIONS

International Search Report for Serial No. PCT/EP2018/060036 dated Apr. 19, 2018.

*Primary Examiner* — Tony H Winner
(74) *Attorney, Agent, or Firm* — McCormick, Paulding & Huber PLLC

(57) ABSTRACT

A hydraulic steering unit (1) is described comprising a supply port arrangement having a pressure port (P) connected to a main flow path (2) and a tank port (T) connected to a tank flow path (3), a first working port arrangement having a first left working port (L1) connected to a first left working flow path (4) and a first right working port (R1) connected to a first right working flow path (5), a variable first left orifice (A2L) connected to the main flow path (2) and to the first left working flow path (4), a variable first right orifice (A2R) connected to the main flow path (2) and to the first right working flow path (5), a variable second left orifice (A3L) connected to the first left working flow path (4) and to the tank flow path (3), a variable second right orifice (A3R) connected to the first right working flow path (5) and to the tank flow path (3), and a second working port arrangement having a second left working port (12) connected to a second left working flow path (9) and a second right working port (R2) connected to a second right working flow path (10), wherein the variable first left orifice (A2L)

(Continued)

is connected to the second left working flow path (9) and the variable first right orifice (A2R) is connected to the second right working flow path (10).

6 Claims, 1 Drawing Sheet

(51) Int. Cl.
*B62D 5/093* (2006.01)
*B62D 7/14* (2006.01)
*B62D 5/14* (2006.01)

(58) Field of Classification Search
USPC .......................................................... 180/414
See application file for complete search history.

(56) References Cited

U.S. PATENT DOCUMENTS

| | | | | |
|---|---|---|---|---|
| 4,958,493 A | * | 9/1990 | Schutten | B62D 5/097 137/596.13 |
| 4,972,916 A | | 11/1990 | Miller | |
| 5,758,740 A | * | 6/1998 | Park | B62D 7/1509 180/442 |
| 5,899,292 A | * | 5/1999 | Paul | B60K 17/30 180/403 |
| 6,131,691 A | * | 10/2000 | Morch | B62D 13/00 180/412 |
| 6,186,266 B1 | * | 2/2001 | Marchant | B62D 7/144 180/236 |
| 2013/0105242 A1 | * | 5/2013 | Mergener | B62D 7/142 180/414 |
| 2014/0374187 A1 | * | 12/2014 | Arbjerg | B62D 5/30 180/441 |
| 2015/0158523 A1 | * | 6/2015 | Ennemark | B62D 5/093 180/403 |
| 2016/0332662 A1 | * | 11/2016 | Porskrog | B62D 5/12 |
| 2018/0319432 A1 | * | 11/2018 | Arbjerg | B62D 5/093 |

FOREIGN PATENT DOCUMENTS

| | | |
|---|---|---|
| DE | 3744346 A1 | 7/1988 |
| DE | 4012539 A1 | 10/1990 |
| DE | 102005011526 A1 | 10/2006 |
| DE | 102012018993 A1 | 3/2014 |
| EP | 2786915 A1 | 10/2014 |
| EP | 3078571 A1 | 10/2016 |

\* cited by examiner

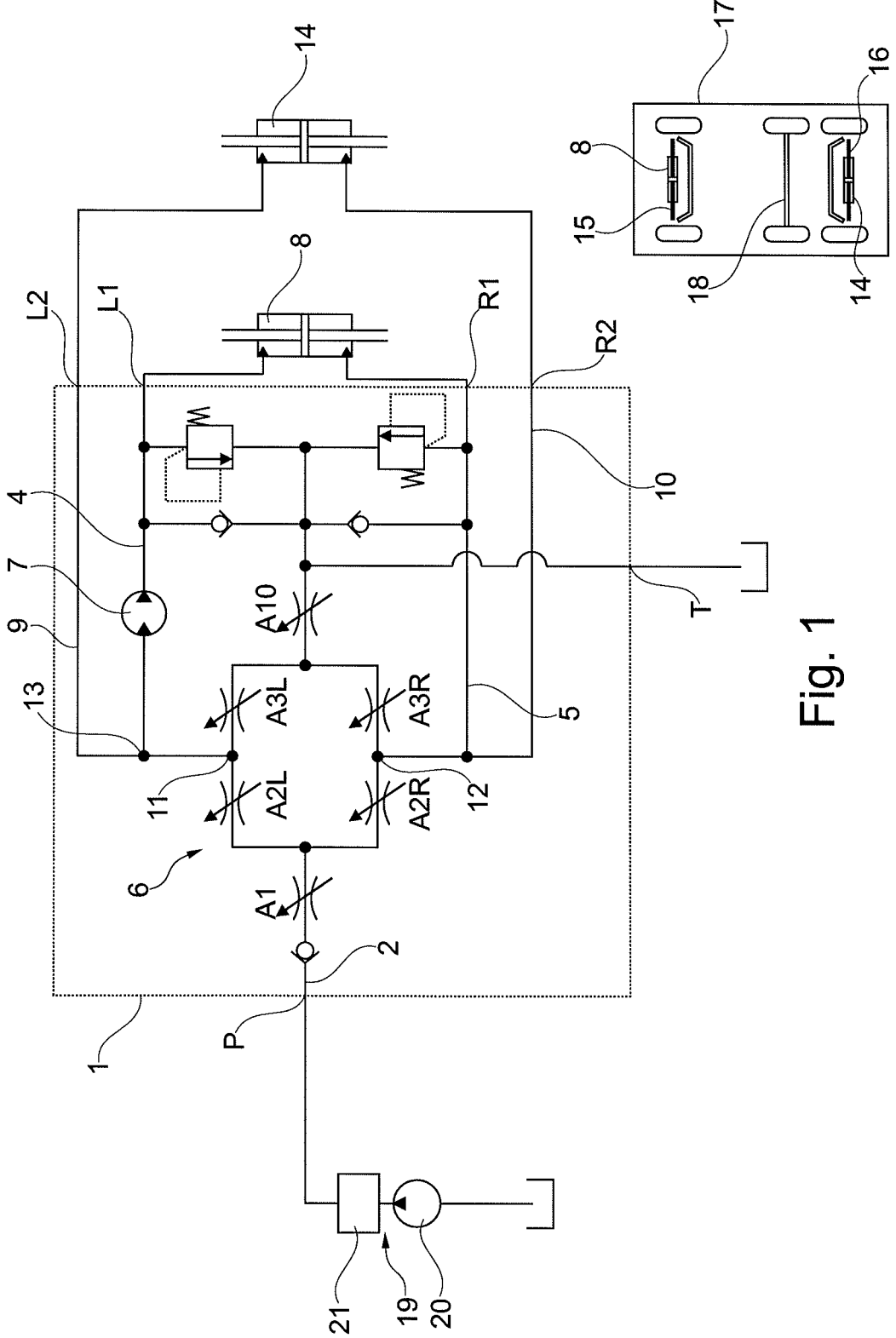

HYDRAULIC STEERING UNIT

CROSS-REFERENCE TO RELATED APPLICATION

This application claims foreign priority benefits under U.S.C. § 119 to German Patent Application No. 10 2017 109 800.3 filed on May 8, 2017, the content of which is hereby incorporated by reference in its entirety.

TECHNICAL FIELD

The present invention relates to a hydraulic steering unit.

BACKGROUND

A hydraulic steering unit is used to steer, for example, wheels of a vehicle.

To this end the driver of the vehicle actuates a steering element, for example, a steering wheel. Hydraulic fluid in the desired amount is then supplied to a steering motor which in turn changes the running direction of the steered wheels.

SUMMARY

The object underlying the invention is to enable application of the steering unit to a more sophisticated vehicle steering.

This object is solved with a hydraulic steering unit comprising a supply port arrangement having a pressure port connected to a main flow path and a tank port connected to a tank flow path, a first working port arrangement having a first left working port connected to a first left working flow path and a first right working port connected to a first right working flow path, a variable first left orifice connected to the main flow path and to the first left working flow path, a variable first right orifice connected to the main flow path and to the first right working flow path, a variable second left orifice connected to the first left working flow path and to the tank flow path, a variable second right orifice connected to this first right working flow path and to the tank flow path, and a second working port arrangement having a second left working port connected to a second left working flow path and a second right working port connected to a second right working flow path, wherein the variable first left orifice is connected to the second left working flow path and the variable first right orifice is connected to a second right working flow path.

Such a hydraulic steering unit can be used, for example, in a vehicle having a dual rear axis steering. A front steering motor steering the front wheels is connected to the first working port arrangement and a rear steering motor steering rear wheels is connected to the second working port arrangement. Such a solution is in particular useful when the vehicle is moved in a heavy environment in which the rear wheels need some auxiliary force to be steered in the right direction.

In an embodiment of the invention the second left working flow path is connected to the first left working flow path and the second right working flow path is connected to the first right working flow path. This facilitates the connections of the respective flow paths.

In an embodiment of the invention a measuring motor is arranged in one of the first left working flow path and the right working flow path. The measuring motor is actuated in one direction, when the hydraulic fluid flows from the working port arrangement to the left working port and is actuated in the other direction when the hydraulic flows reverse, i.e. from the working port to the tank port. Such a solution minimizes the dead band of the steering unit.

In an embodiment of the invention the measuring motor is arranged downstream a connection between the respective first working flow path and the second working flow path. In other words, the measuring motor measures only the amount of hydraulic fluid to the first working port arrangement. The second working port arrangement receives just the same pressure as the first working port arrangement. The quantity of fluid supplied to the second working port arrangement does not influence the behavior of the steering unit.

BRIEF DESCRIPTION OF THE DRAWINGS

An embodiment of the invention will now be described in more detail with reference to the drawing, in which:

FIG. 1 shows a schematic circuit diagram of a hydraulic steering unit and

FIG. 2 shows a schematic illustration of a vehicle having three axes.

DETAILED DESCRIPTION

FIG. 1 schematically shows a hydraulic steering unit 1 comprising a supply port arrangement having a pressure port P connected to a main flow path 2 and a tank port P connected to a tank flow path 3. Furthermore, the steering unit 1 comprises a first working port arrangement having a first left working port L1 connected to a first left working flow path 4 and a first right working port R1 connected to a first right working flow path 5.

Control of fluid from the pressure port P to one of the first working ports L1, R1 is performed by means of a so called "bridge" 6. The bridge 6 comprises a variable first left orifice A2L connected between the main flow path 2 and the first left working flow path 4, a variable first right orifice A2R connected between the main flow path 2 and the first right working flow path 5, a variable second left orifice A3L connected between the first left working flow path 5 and the tank flow path 3, and a variable second right orifice A3R connected between the first right working flow path 5 and the tank flow path 3.

A measuring motor 7 is arranged in the first left working flow path 4. It can, however, instead be arranged in the first right working flow path 5.

The variable orifices A2L, A3L, A2R, A3R can be formed by a spool-sleeve set which is arranged in a housing of the steering unit. When a steering wheel is rotated (or another steering element is actuated) a spool is rotated relative to a sleeve. When, for example, a steering to the left is desired, such a relative rotation opens the first left orifice R2L and the second right orifice A3R. The other two orifices A3L and A2R are closed. All the fluid from the pressure port P now flows through the first left orifice, the first left working flow path 4 to the first left working port L1 and from there to a steering motor connected to the first working port arrangement L1, R1. Hydraulic fluid displaced from the steering motor 8 returns through the first right working port R1 and the first right working flow path 5 to the second orifice 3 and the tank flow path 3 to the tank port T. The fluid flow actuates the measuring motor 7 which restores the angular relation between spool and sleeve to an initial position, in which the variable orifices A2L, A3L, A2R, A3R are closed or show only a minimum opening.

Arrangement of the measuring motor 7 in one of the first working flow path 4, 5 minimizes or avoids a dead band of the steering.

The steering unit 1 comprises a second working port arrangement having a second left working port L2 connected to a second left working flow path 9 and a second right working port R2 connected to a second right working flow path 10.

The second left working flow path 9 is connected to a point 11 between the first left orifice A2L and the second left orifice A3L. The second right working flow path 10 is connected to a point 12 between the first right orifice A2R and the second right orifice A3R. At the same time the second left working flow path 9 is connected to the first left flow path 4 and the second right working flow path 10 is connected to the first right working flow path 5. However, the measuring motor 7 is arranged outside the second left working flow path 9, i.e. downstream a connection point 13 between the first left working flow path 4 and the second left working flow path 9. This means that only hydraulic fluid supplied to the first working port arrangement L1, R1 flows through the measuring motor 7. The second working port arrangement L2, R3 is supplied with hydraulic fluid having the same pressure at the hydraulic fluid at the first working port arrangement L1, R1. However, the amount of hydraulic fluid flowing to the second working port arrangement L2, R2 does not influence the steering behavior of the steering unit 1.

A second steering motor 14 is connected to the second working port arrangement L2, R2.

FIG. 2 schematically shows the arrangement of the steering motors 8, 14 at a front axis 15 and at a second rear axis 16 of a steered vehicle 17. A further rear axis 18 of the vehicle is not steered.

Since only the pressure at the second working port arrangement L2, R2 is controlled and not the flow to this second working port arrangement L2, R2, the second steering motor 14 is just supplied with an auxiliary force enabling the second steering motor 14 to steer the wheels at the rear axis 16 in a slave manner to the wheels at the front axis 15. It is therefore possible to incorporate the second steering cylinder 14 into a steering system with a steering unit without changing a steering ratio.

A main orifice A1 is arranged in the main flow path 2. The main orifice A1 determines the amount of fluid supplied to the first working port arrangement L1, R1 and to the second working port arrangement L2, R2.

A tank orifice A10 can be arranged in the tank fluid line 3. However, this tank orifice A10 can also be omitted.

The pressure port P is connected to a controlled pressure source 19. The pressure source 19 can basically have any form. For example, a pump 20 can be used together with a priority valve 21 or a pressure controlled pump 20 can be used. Load sensing ports or the like are omitted in this explanation to keep a simple overview.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a supply port arrangement having a pressure port (P) connected to a main flow path and a tank port (T) connected to a tank flow path, a first working port arrangement having a first left working port (L1) connected to a first left working flow path and a first right working port (R1) connected to a first right working flow path, a variable first left orifice (A2L) connected to the main flow path and to the first left working flow path, a variable first right orifice (A2R) connected to the main flow path and to the first right working flow path, a variable second left orifice (A3L) connected to the first left working flow path and to the tank flow path, a variable second right orifice (A3R) connected to the first right working flow path and to the tank flow path, and a second working port arrangement having a second left working port (12) connected to a second left working flow path and a second right working port (R2) connected to a second right working flow path, wherein the variable first left orifice (A2L) is connected to the second left working flow path and the variable first right orifice (A2R) is connected to the second right working flow path.

2. A hydraulic steering unit comprising:
   a supply port arrangement having a pressure port (P) connected to a main flow path and a tank port (T) connected to a tank flow path,
   a first working port arrangement having a first left working port (L1) connected to a first left working flow path and a first right working port (R1) connected to a first right working flow path,
   a variable first left orifice (A2L) connected to the main flow path and to the first left working flow path,
   a variable first right orifice (A2R) connected to the main flow path and to the first right working flow path,
   a variable second left orifice (A3L) connected to the first left working flow path and to the tank flow path,
   a variable second right orifice (A3R) connected to the first right working flow path and to the tank flow path, and
   a second working port arrangement having a second left working port (12) connected to a second left working flow path and a second right working port (R2) connected to a second right working flow path,
   wherein the variable first left orifice (A2L) is connected to the second left working flow path and the variable first right orifice (A2R) is connected to the second right working flow path, and
   wherein the second left working flow path is connected to the first left working flow path and the second right working flow path is connected to the first right working flow path.

3. The hydraulic steering unit according to claim 2, wherein a measuring motor is arranged in one of the first left working flow path and the first right working flow path.

4. The hydraulic steering unit according to claim 3, wherein the measuring motor is arranged downstream a connection between the respective first working flow path and the second working flow path.

5. The hydraulic steering unit according to claim 1, wherein a measuring motor is arranged in one of the first left working flow path and the first right working flow path.

6. The hydraulic steering unit according to claim 5, wherein the measuring motor is arranged downstream a connection between the respective first working flow path and the second working flow path.

* * * * *